United States Patent
Grabarnik et al.

(10) Patent No.: US 9,524,281 B2
(45) Date of Patent: Dec. 20, 2016

(54) CREDIBILITY OF TEXT ANALYSIS ENGINE PERFORMANCE EVALUATION BY RATING REFERENCE CONTENT

(75) Inventors: Genady Grabarnik, Scarsdale, NY (US); Lev Kozakov, Stamford, CT (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1162 days.

(21) Appl. No.: 13/477,730

(22) Filed: May 22, 2012

(65) Prior Publication Data
US 2013/0191717 A1 Jul. 25, 2013

Related U.S. Application Data

(63) Continuation of application No. 12/248,132, filed on Oct. 9, 2008, now Pat. No. 8,214,734.

(51) Int. Cl.
*G06F 17/00* (2006.01)
*G06F 17/24* (2006.01)
*G06F 17/30* (2006.01)

(52) U.S. Cl.
CPC ......... *G06F 17/241* (2013.01); *G06F 17/3071* (2013.01); *G06F 17/30598* (2013.01); *G06F 17/30705* (2013.01)

(58) Field of Classification Search
CPC .............. G06F 17/241; G06F 17/30705; G06F 17/3071; G06F 17/30864; G06F 17/30598; G06F 17/30616; G06F 17/30867; G06F 17/30675; G06Q 10/10; G06Q 30/02

(Continued)

(56) References Cited

U.S. PATENT DOCUMENTS 6,900,819 B2  5/2005  Marshall et al.
7,139,752 B2  11/2006 Broder et al.
(Continued)

OTHER PUBLICATIONS

Steuer et al., "Validation and functional annotation of expression-based clusters based on gene ontology", BMC Bioinformatics 2006, http://bmcbioinformatics.biomedcentral.com/articles/10.1186/1471-2104-7-380, pp. 25.*

(Continued)

*Primary Examiner* — Chau Nguyen
(74) *Attorney, Agent, or Firm* — Francis Lammes; Stephen J. Walder, Jr.; Mercedes L. Hobson (57) ABSTRACT

Evaluating the performance of a text analysis engine is provided. A plurality of pre-annotated reference documents and a set of annotation types associated with the pre-annotated reference documents are received. Annotation contexts of reference annotations in the plurality of pre-annotated reference documents are analyzed using the set of annotation types. Similar annotation contexts are identified between the reference annotations and the set of annotation types. Responsive to identifying the similar annotation contexts, the similar annotation contexts are clustered thereby forming a plurality of reference annotation clusters. A set of reference content heterogeneity scores are computed based on the number of reference annotation clusters for each annotation type in the set of annotation types. An integral reference content rate for the set of annotation types is then computed and output to a user.

17 Claims, 4 Drawing Sheets

(58) Field of Classification Search
USPC .................................................. 715/230–233
See application file for complete search history.

(56) References Cited

U.S. PATENT DOCUMENTS

| | | | |
|---|---|---|---|
| 7,146,361 | B2 | 12/2006 | Broder et al. |
| 7,191,119 | B2 | 3/2007 | Epstein et al. |
| 7,756,866 | B2 | 7/2010 | Bhalotia et al. |
| 7,890,512 | B2 | 2/2011 | Mei et al. |
| 7,899,822 | B2 | 3/2011 | Chakravarthy et al. |
| 7,962,465 | B2 * | 6/2011 | Kraft et al. ............... 707/706 |
| 8,095,538 | B2 | 1/2012 | Hawking |
| 8,122,335 | B2 | 2/2012 | Duhig et al. |
| 2002/0107843 | A1 | 8/2002 | Biebesheimer et al. |
| 2003/0217052 | A1 | 11/2003 | Rubenczyk et al. |
| 2004/0243556 | A1 | 12/2004 | Ferrucci et al. |
| 2006/0248054 | A1 | 11/2006 | Kirshenbaum et al. |
| 2007/0150802 | A1 * | 6/2007 | Wan .................. G06F 17/241 715/205 |
| 2008/0235283 | A1 | 9/2008 | Turnball et al. |
| 2008/0298766 | A1 * | 12/2008 | Wen .............. G06F 17/30259 386/282 |
| 2009/0204637 | A1 * | 8/2009 | Li et al. .................. 707/104.1 |
| 2009/0265338 | A1 | 10/2009 | Kraft et al. |
| 2009/0313294 | A1 * | 12/2009 | Mei et al. ............... 707/103 R |
| 2010/0095196 | A1 * | 4/2010 | Grabarnik ........... G06F 17/241 715/230 |

OTHER PUBLICATIONS

Sabin Kafle, "A heterogeneous clustering approach for Human Activity Recognition", Jan. 15, 2005, University of Oregon, Eugene, OR, pp. 30.*

Robert Cannon and Fred Howell, "Enhancing documents with annotations and machine-readable structured information using Notate", 4th Mar. 2007, www.textensor.com/enhancing-documents-207.html, pp. 19.*

USPTO U.S. Appl. No. 12/248,132, Image File Wrapper, May 3, 2012, 2 pages.

"Eagles Evaluation of Natural Language Processing Systems", Final Report, Eagles Doc. EAG-EWG-PR. 2, Sep. 1995, http://www.issco.unige.ch/ewg95/ewg95.html., 2 pages. Sep. 1995, 2 pages.

"Evaluation of NLP systems: References", http://acdc.linguateca.pt/aval_conjunta/bibEval.html, printed Oct. 9, 2008, 9 pages.

"GATE—General Architecture for Text Engineering", http://gate.ac.uk, printed from the Internet on Oct. 7, 2008, 1 page.

"Information Retrieval", http://en.wikipedia.org/wiki/Information_retrieval, printed from the Internet on Oct. 7, 2008, 6 pages.

"Linguistic Annotation", http://www.ldc.upenn.edu/annotation, printed from the Internet on Oct. 7, 2008, 12 pages.

"Natural Language Processing", http://wikipedia.org/wiki/Natural_language_processing, printed Oct. 7, 2008, 6 pages.

"Semantic Search", http://en.wikipedia.org/wiki/Semantic_search, printed Oct. 7, 2008, 2 pages .

"Syntactic Categories", http://en.wikipedia.org/wiki/Category:Syntactic_categories, printed from the Internet on Oct. 8, 2008, 1 page.

"Text Analysis Info Page", http://textanalysis.info/, printed from the Internet on Oct. 7, 2008, 1 page.

"Text Retrieval Conference (TREC)", http://trec.nist.gov/, printed from the Internet on Oct. 8, 2008, 3 pages.

"UIMA Component Repository", http://uima.lti.cs.cmu.edu:8080/UCR/Welcome.do, printed from the Internet on Oct. 8, 2008, 1 page.

"Unstructured Information Management Architecture (UIMA)", http://www.research.ibm.com/UIMA/, printed from the Internet on Oct. 7, 2008, 2 pages.

Baumgartner, William et al., "Directory of Open Access Journals", Journal of Biomedical Discovery and Collaboration, 2008, 3 pages.

Caporaso, J. G. et al., "Intrinsic Evaluation of Text Mining Tools May Not Predict Performance on Realist Tasks", Pacific Symposium on Biocomputing, 2008, 12 pages.

Chinchor, Nancy, "MUC-4 Evaluation Metrics", Proceedings of the 4th Conference on Message Understanding, McLean Virginia, 1992, pp. 22-29.

Gotz, T. et al., "Design and Implementation of the UIMA Common Analysis System", IBM Systems Journal, vol. 43, No. 3, 2004, pp. 476-489.

Guida, G. et al., "Evaluation of Natural Language Processing Systems: Issues and approaches", http://ieeexplore.ieee.org/ie15/5/31363/01457848.pdf?tp=&isnumber=&arnumber=1457848, Proceedings of the IEEE, vol. 74, Issue 7, Jul. 1986, 1 page.

Hammond, Brian et al., "Semantic Enhancement Engine: A Modular Document Enhancement Platform foe Semantic Applications over Heterogeneous Content", 2002, Real World Semantic Web Applications, IOS Press, pp. 1-22.

Jones, Karen S. et al., "Towards Better NLP System Evaluation", Human Language Technology Conference, Proceedings of the Workshop on Human Language Technology, 1994, pp. 102-107.

Lehnert, Wendy et al., "A Performance Evaluation of Text Analysis Technologies", AI Magazine, Fall 1991, pp. 81-94.

Michelson, Matthew et al., "Semantic Annotation of Unstructured and Ungrammatical Text", http://citeseer.ist.psu.edu/michelson05semantic.html, 2005, 8 pages. 2005.

Wang, Yue et al., "Raising the Compatibility of Heterogeneous Annotations: A Case Study on Protein Mention Recognition", BioNLP 2008, Columbus, Ohio, USA, Jun. 2008 (c) 2008 Association for Computational Linguistics, 2 pages.

Zhang, Tong et al., "Text Chunking based on a Generalization of Winnow", Journal of Machine Learning Research 2, 2002, pp. 615-637.

* cited by examiner

CREDIBILITY OF TEXT ANALYSIS ENGINE PERFORMANCE EVALUATION BY RATING REFERENCE CONTENT

BACKGROUND OF THE INVENTION

1. Field of the Invention

The present application relates generally to an improved data processing apparatus and method and more specifically to an apparatus and method for improving credibility of text analysis engine performance evaluation by rating reference content.

2. Background of the Invention

Text analysis (TA), as a part of Natural Language Processing (NLP), plays an important role in modern information technology (IT) industry everywhere from information search and retrieval systems to e-commerce and e-learning systems, etc. Usually, TA tools, such as annotators, text analysis engines (TAEs), or the like, process textual documents and create linguistic annotations. In general, linguistic annotations may be defined as descriptive or analytic notations applied to raw language data. Generally, TAEs perform textual annotations that tag certain regions or spans of a document by using appropriate metadata, for example, semantic labels. The following example contains 3 different textual annotations—'Person', 'Organization', and 'Location':

"The underlying economic fundamentals remain sound as has been pointed out by the Fed," said <annot type="Person">Alan Gayle</annot>, a managing director of <annot Type="Organization">Trusco Capital Management</annot> in <annot type="Location" kind="city">Atlanta</annot>, "though fourth-quarter growth may suffer".

Different tags, created by TAEs, are normally associated with the annotation types used by each TAE. The annotation type definition may include both semantic information and attributes, such as kind="city" in the above example. The annotation types used by a given TAE form the annotation type system of the TAE.

The quality/performance of TAEs is an important factor that has significant impact on business decisions. Consider, for example, the following realistic business case: A user needs to perform semantic search on a certain collection of documents. A semantic search attempts to augment and improve traditional research searches by leveraging Extensible Markup Language (XML) and Resource Description Framework (RDF) data from semantic networks to disambiguate semantic search queries and web text in order to increase relevancy of results. The required step in a semantic search is disambiguation of terms/keywords that will be used for indexing and search. This may be achieved by creating annotations that carry required semantic information. The user may map the information/knowledge domain(s) of the document collection to available annotation type system(s). Having certain annotation types in mind, the user may select the best TAE from the list of available components to annotate the given document collection. The TAE selection may be based on the published quality/performance rates that characterize each available TAE. These rates are usually obtained by the TAE developers or evaluators based on processing pre-annotated collections of reference documents that have no direct association with the given document collection. To be able to make efficient business decisions regarding the TAE selection the user needs additional information that characterizes credibility of published TAE quality rates.

BRIEF SUMMARY OF THE INVENTION

In one illustrative embodiment, a method, in a data processing system, is provided for evaluating the performance of a text analysis engine. The illustrative embodiments receive a plurality of pre-annotated reference documents and a set of annotation types associated with the pre-annotated reference documents. The illustrative embodiments analyze annotation contexts of reference annotations in the plurality of pre-annotated reference documents using the set of annotation types. The illustrative embodiments identify similar annotation contexts between the reference annotations and the set of annotation types. The illustrative embodiments cluster the similar annotation contexts thereby forming a plurality of reference annotation clusters in response to identifying the similar annotation contexts. The illustrative embodiments compute a set of reference content heterogeneity scores based on the number of reference annotation clusters for each annotation type in the set of annotation types. The illustrative embodiments compute an integral reference content rate for the set of annotation types and output the integral reference content rate to a user.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

The illustrative embodiments provide a mechanism for improving the credibility of text analysis engine performance evaluation by rating reference content. The mechanism improves the process of evaluating TAEs by developing reference content rates that characterize the credibility of the TAE performance metrics, which are obtained based on a given reference content. The reference content rates are based on measuring the heterogeneity of the given reference content from the point of view of the annotation types used by a given TAE. To measure the heterogeneity of the reference content, the illustrative embodiments identify the context of every reference annotation in every reference document. Then all annotations are split into several clusters, based on their annotation types and similarity of their annotation contexts. Given the number of clusters of annotation contexts the illustrative embodiments compute a coefficient that characterizes the diversity of the annotation contexts in the given reference content for each given annotation type. This coefficient is the reference content rate that characterizes how good the given reference content for evaluating the performance of the given TAE is in relation to the given annotation type. The reference content rate measures the credibility of the performance metrics obtained for the given TAE as applied to the given annotation type. The reference content rates for all annotation types used by the given TAE are then combined to assign the confidence rate to the published TAE performance metrics.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
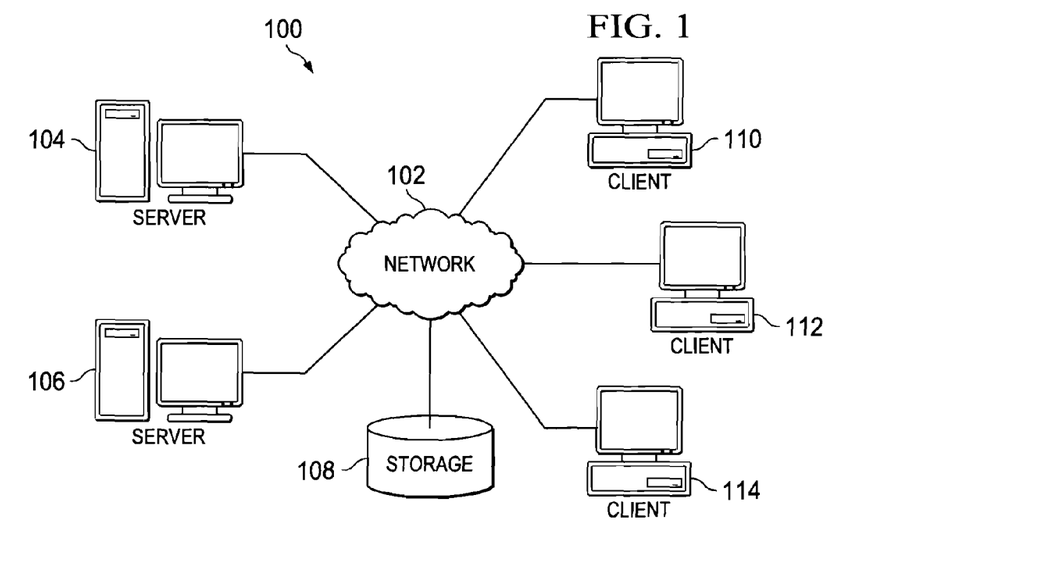
FIG. 1 depicts a pictorial representation of an example distributed data processing system in which aspects of the illustrative embodiments may be implemented.
Figure 2:
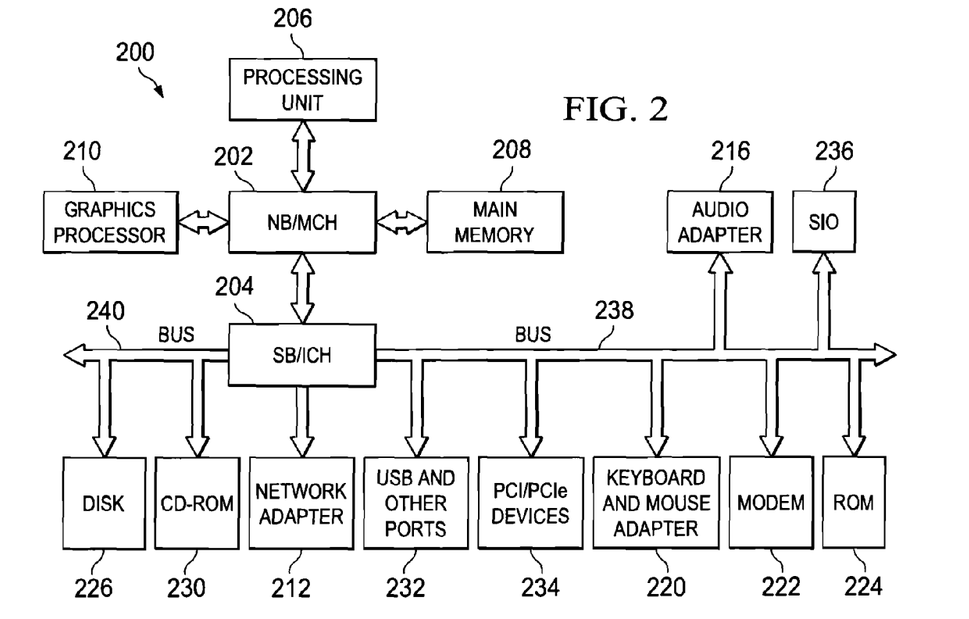
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism that improves the credibility of text analysis engine performance evaluation by rating reference content, this is only an example and is not intended to state or imply any limitation with regard to the features of the present invention. To the contrary, the illustrative embodiments are intended to include distributed data processing environments and embodiments in which a mechanism for improving the credibility of text analysis engine performance evaluation by rating reference content may operate.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a mechanism for improving the credibility of text analysis engine performance evaluation by rating reference content heterogeneity. The mechanism improves the process of evaluating TAEs by developing reference content rates that characterize the credibility of the TAE performance metrics, which are obtained based on a given reference content. The mechanism may be an application that is executed on a data processing system, such as data processing system 200 of FIG. 2. As described above, evaluation has become an important and pressing concern for researchers in text analysis (TA). The difficulties with evaluating TA systems and text analysis engines (TAEs) are substantial and depend on the area of specialization. There are different types of evaluation procedures for TA systems and/or TAEs:

Intrinsic evaluation, when the performance of an isolated TAE is evaluated against 'golden results' for pre-annotated reference documents;

Extrinsic evaluation, when a more complex TA system is evaluated in terms of the TA system's utility with respect to the overall task of the system;

Black-box evaluation, when an isolated TAE or a TA system runs on a given reference data set to measure a number of parameters related to the quality of the process and the quality of results; and Glass-box evaluation, which looks at the design of the TA system, for example, algorithms and implementation, within the TA system.

Figure 3:
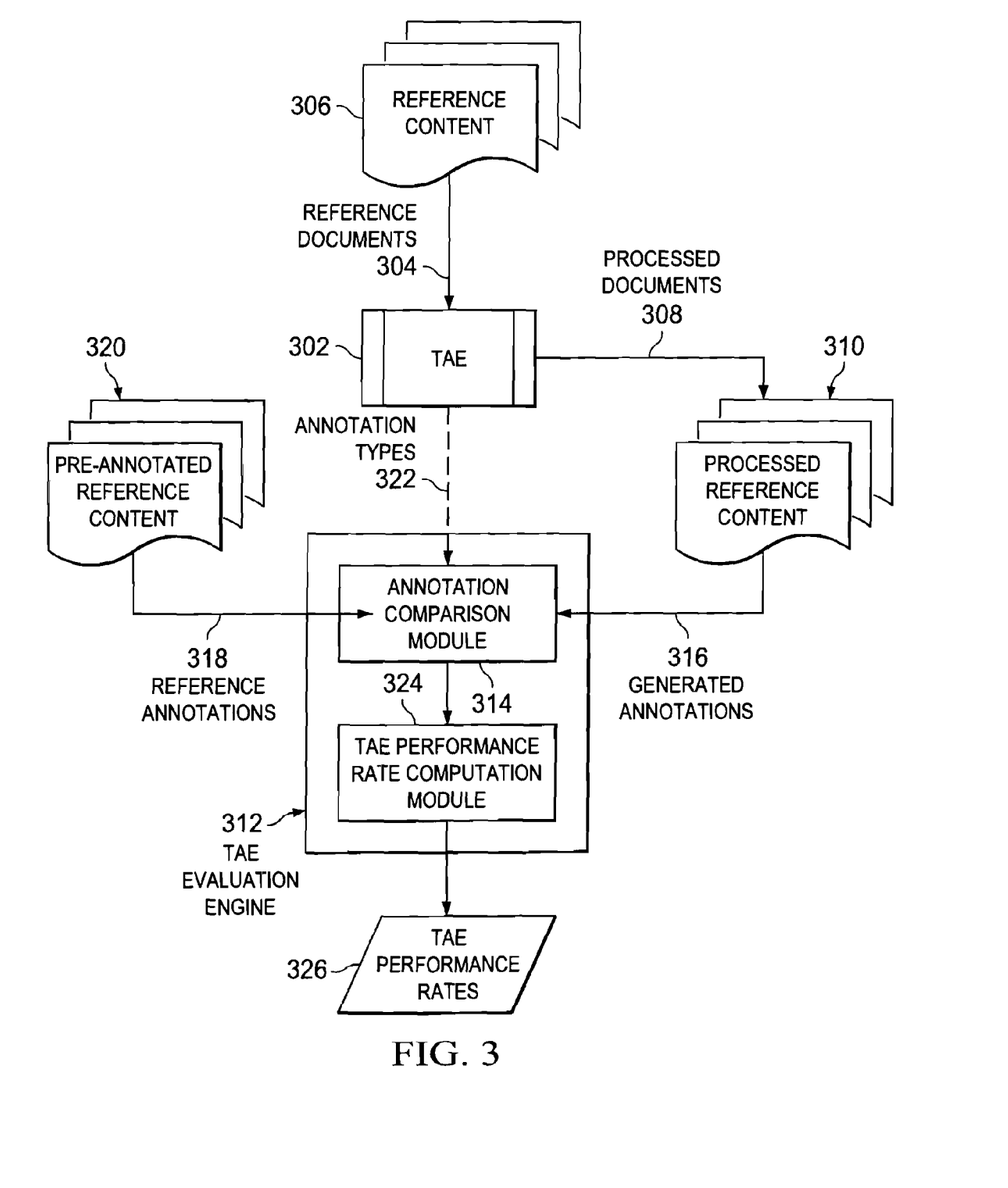
FIG. 3 illustrates a typical intrinsic black-box text analysis engine (TAE) evaluation procedure in accordance with an illustrative embodiment.

FIG. 3 illustrates a typical intrinsic black-box text analysis engine (TAE) evaluation procedure in accordance with an illustrative embodiment. In the black-box TAE evaluation, TAE 302 uses reference documents 304 from reference content 306 to produce processed documents 308 which are stored as processed reference content 310. Once TAE 302 produces processed documents 308, TAE evaluation engine 312 uses annotation comparison module 314 to compare generated annotations 316 for one or more of processed documents 308 with reference annotations 318 from pre-annotated reference content 320 using annotation types 322 provided by TAE 302. TAE evaluation engine 312 then uses TAE performance rate computation module 324 to compute TAE performance rates 326 separately for each relevant annotation type, which may be combined into integral TAE rates. The standard TAE performance rates include precision, recall, and combined F-measure—similar to the performance metrics used for the information retrieval domain. Applying these performance metrics to the text analysis domain, the following slightly modified definitions may be obtained:

$$\text{precision} = \frac{\text{number\_of\_correct\_annotations\_created\_by\_TAE}}{\text{number\_of\_all\_annotations\_created\_by\_TAE}}$$

$$\text{recall} = \frac{\text{number\_of\_correct\_annotations\_created\_by\_TAE}}{\text{number\_of\_all\_annotations\_in\_the\_reference\_content}}$$

$$F-\text{measure} = 2 * \frac{(\text{precision} * \text{recall})}{(\text{precision} + \text{recall})}$$

From these definitions, the performance metrics take into account only the absolute numbers, like the number of all reference annotations in the reference document and the number of all annotations created by the evaluated TAE. The metrics, however, do not take into account characteristics of the reference content itself, which may have significant impact on the credibility of the TAE evaluation results. This problem is illustrated using the following example:

Request to evaluate a TAE that annotates document dates.

The reference document collection, used for this evaluation, consists of documents that always include the document date at the beginning, like in the following example: "Nov. 18, 2003. Federal Signal Appoints CEO . . . ."

The pre-annotated reference content may look like: "<annot type="Date" kind="doc_date">Nov. 18, 2003</annot>. Federal Signal Appoints CEO . . . ."

Based on the pattern learned from the reference content, the TAE always annotates the first date in each input document, as the document date. If this pattern applies to all documents in the given reference collection, the TAE creates all correct annotations, so it may get the highest performance rates. However, this pattern may not apply to any other document from a different collection, so the TAE could get lower performance rates, if another reference document collection was used for the evaluation.

Existing TAE evaluation practice keeps human evaluators responsible for selecting appropriate reference document collections. To facilitate the evaluations of TAEs, several standard reference document collections had been created. It is clear, however, that existing standard reference document collections cannot cover all possible application domains. One example is the Technical Support domain, where documents may significantly differ from typical news articles or legal documents. Evaluating a TAE in such a non-standard domain requires selecting and pre-annotating the appropriate reference document collection associated with the domain of interest. The selected reference document collection should be rich enough to enable reliable evaluation of the TAE in question, so that the obtained TAE performance metrics remain valid when the TAE is used to process other document collections in the given domain. This procedure is highly labor intensive and time consuming and may not be performed for each particular document collection. Instead of users performing evaluations on their own, the users simply select TAEs based on the published performance rates, obtained by using standard TAE evaluation procedures. However, questions not addressed by the current TAE evaluation procedures may be:

How good is this particular pre-annotated reference document collection for evaluating the given TAE?

Will the given TAE performance metrics, created based on the given pre-annotated reference document collection, hold for other document collections?

The mechanism of the illustrative embodiments improves the process of evaluating TAEs by developing reference content rates that characterize the credibility of the TAE performance metrics, which are obtained based on a given reference content. In order to rate reference content heterogeneity, a context of the annotation in the given document is defined as the set of features that characterizes the annotation and the annotation's neighborhood in the document content within the limits of the sentence containing the annotation. The set of features may include the following categories:

Annotation type, like 'person', 'place', or 'date'; each TAE defines/uses one or more annotation types, Positioning features (position of the sentence that contains the annotation, position of the annotation within the sentence, or the like), Left side features (neighboring annotations and tokens— words, punctuation marks and special symbols—before the annotation, ordered from right to left, Right side features (neighboring annotations and tokens—words, punctuation marks and special symbols—after the annotation, ordered from left to right), and/or Syntactic features.

The number of features included in the annotation context depends on selected 'context window size' for both the right and the left side context windows. To illustrate this definition, consider the following annotated text:

<annot type="Person">Robert D. Welding</annot> has been appointed as <annot type="Occupation">president</annot> and <annot type="Occupation">chief executive officer</annot> of <annot type="Organization" kind="company">Federal Signal Corporation</annot>/(<annot type="Ticker">NYSE:FSS</annot>) of <annot type="Location" kind="city">Oak Brook, Illinois </annot>.

The annotation context for the "company" annotation in this example may look like the following:

1. Annotation type—
   type=Organization
   kind=company
2. Positioning features—
   sentence_position=3 (number of sentences before this sentence),
   annotation_position=14 (number of tokens/words before this annotation).
3. Left side features (right-to-left)—
   token='of' (word that precedes the annotation),
   annotation: type=Occupation (annotation that precedes the token "of").
4. Right side features (left-to-right)—
   token='/' (symbol that follows the annotation),
   token='(' (symbol that follows the token '/'),
   annotation: type=Ticker (annotation that follows the token '('),
   token=')' (symbol that follows the annotation "ticker").
5. Syntactic features—
   POS=proper_name Once the context of the annotation in the given document is defined, criteria of similarity are defined between annotation contexts, so that similar and different annotation contexts may be identified. For example, two annotations of a certain type (e.g., 'Person' or 'Organization', etc.) had been selected in the given reference content (document collection), and their associated annotation contexts had been identified, including existing semantic attributes, like kind="city" for "Location" annotation. If the annotation contexts of the two annotations have a similar set of features, a conclusion may be made that the second annotation context is similar to the first annotation context. The features of the two annotation contexts may be compared directly or based on more sophisticated methods, similar to the techniques developed for text chunking.

Figure 4:
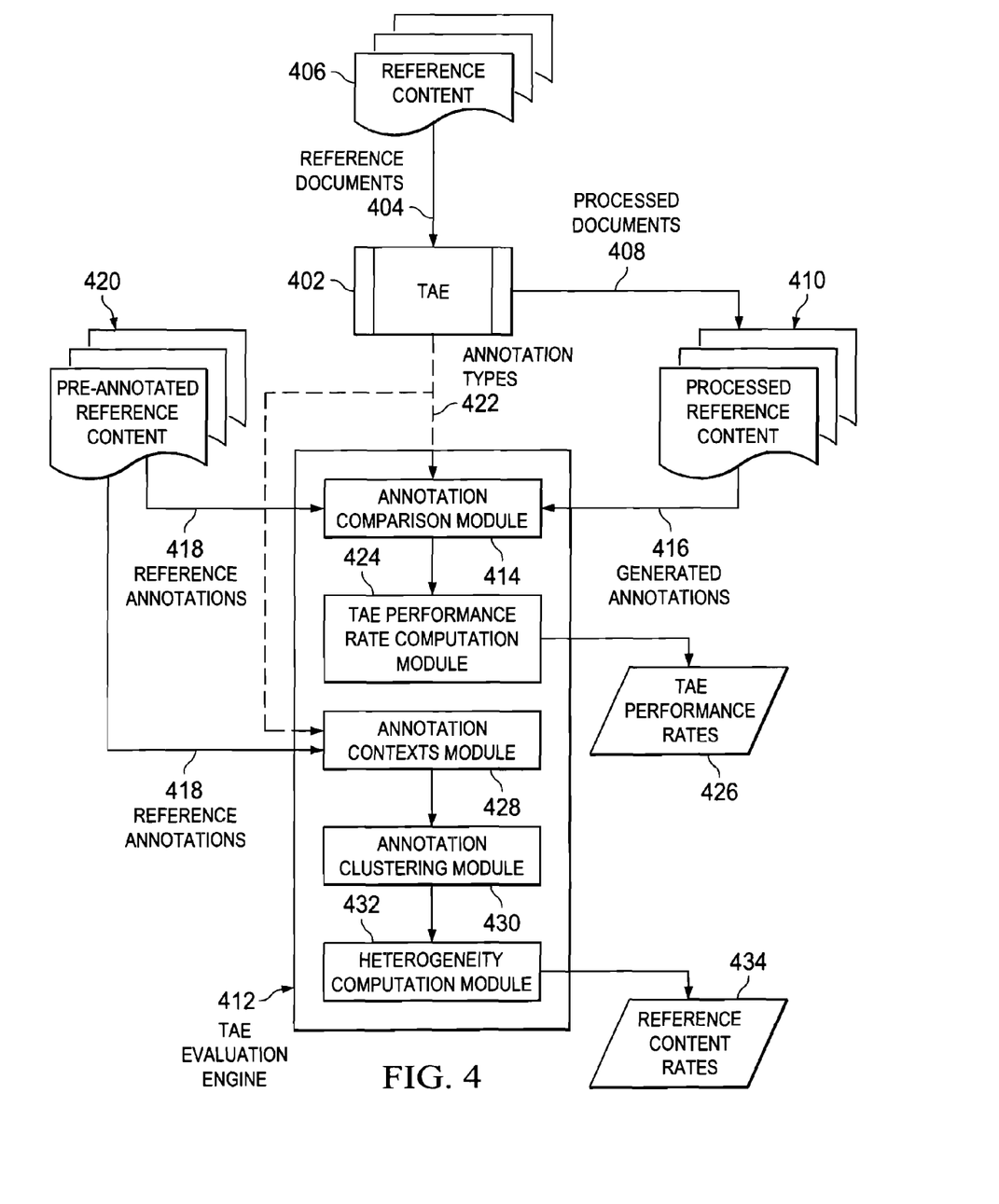
FIG. 4 illustrates an example of a mechanism that improves the credibility of text analysis engine performance evaluation by rating reference content heterogeneity.

FIG. 4 illustrates an example of a mechanism that improves the credibility of text analysis engine performance evaluation by rating reference content heterogeneity. With the mechanism described in FIG. 3, text analysis engine (TAE) 402 uses reference documents 404 from reference content 406 to produce processed documents 408 which are stored as processed reference content 410. Once TAE 402 produces processed documents 408, TAE evaluation engine 412 uses annotation comparison module 414 to compare generated annotations 416 for one or more of processed documents 408 with reference annotations 418 from pre-annotated reference content 420 using annotation types 422 provided by TAE 402. TAE evaluation engine 412 then uses TAE performance rate computation module 424 to compute TAE performance rates 426 separately for each relevant annotation type, which may be combined into integral TAE rates.

In addition to providing TAE performance rates 426, TAE evaluation engine 412 also uses annotation contexts module 428 to analyze contexts of all reference annotations 418 for all annotation types 422 used by an identified TAE, such as TAE 402. Annotation contexts module 428 identifies similar annotation contexts between all reference annotations 418 for all annotation types 422 used by an identified TAE. Once all of the similar annotation contexts have been identified, annotation clustering module 430 clusters similar annotation contexts. That is, annotation clustering module 430 groups reference annotations 418 into several groups (clusters) based on a similarity of their contexts. Reference annotations 418 of the same type may be split over several annotation clusters.

Heterogeneity computation module 432 then computes reference content heterogeneity scores based on the number of reference annotation clusters for each annotation type. Heterogeneity computation module 432 computes a normalized reference content heterogeneity score per annotation type using the following equation:

$$CH(T) = \frac{\text{number\_of\_reference\_annotation\_clusters\_for\_type\_T}}{\text{number\_of\_content\_units\_in\_reference\_content}},$$

where a content unit may be a certain amount of lines, sentences, or the like, for example, 100 sentences. Note: this definition assumes that the volume of the reference content is large enough. That is, the number of 'content units' should be much bigger (in orders of magnitude) than the number of annotation types. If the reference content consists of just a few units, the formula may provide inaccurate results (e.g., for 1 content unit and 1 annotation type, the CH may be 100%). While this illustrative embodiment provides one example to compute a reference content heterogeneity score, one of ordinary skill in the art would recognize that there are other ways to compute the reference content heterogeneity score with regard to the illustrative embodiments without departing from the spirit and scope of the present invention. Heterogeneity computation module 432 may then produce reference content rates 434 on a per annotation type requirement or heterogeneity computation module 432 may combine reference content heterogeneity scores for all annotation types used by a given TAE into one integral reference content rate. Reference content rates 434 may serve as the confidence rate to the published TAE performance metrics or reference content rates 434 may be applied to standard performance rates for the TAE, so that a user may identify if reference content rates 434 are reliable performance rates. The reliable performance rates may be generated by multiplying the reference content rates to the standard performance rates in order to obtain an adjusted performance rate, although other methods may be employed without departing from the scope of this invention.

Heterogeneity computation module 432 may combine reference content heterogeneity scores for all annotation types used by a given TAE into one integral reference content rate in a number of different ways. One example is to combine the content heterogeneity scores for all annotation types with equal normalizing coefficients:

$$ContentRate = \sum_{n=1}^{N\_types} \frac{1}{N\_types} CH(T_n),$$

where N_types is the number of annotations types, and $T_n$(n=1, N_types) are annotations types.

Other values that may be provided by heterogeneity computation module 432 are a combined weighted content heterogeneity score for different annotation types and an estimate of the adjusted reference content rate by taking into account the relations between the type system of the given TAE and the type system of the projected usage domain. Heterogeneity computation module 432 measures the contribution of each TAE annotation type to the projected usage domain type system and sum weighted content heterogeneity scores over all TAE annotation types. An example formula may look as follows:

$$AdjustedContentRate(\text{domain}) = \sum_{n=1}^{N\_types} CH(T_n) \times \text{weight}(T_n, \text{domain}),$$

where weight ($T_n$, domain) is the weight of the annotation type $T_n$ in the projected usage domain, i.e. a normalized coefficient that characterizes the semantic 'distance' between the given annotation type and the type system of the projected usage domain. This combined adjusted content rate provides a credible estimation of expected performance of a given TAE in a given usage domain.

The illustrative embodiments provide a mechanism that improves the process of evaluating TAEs by developing reference content rates that characterize the credibility of the TAE performance metrics. The reference content rates are based on measuring the heterogeneity of the given reference content from the point of view of the annotation types used by a given TAE.

Figure 5:
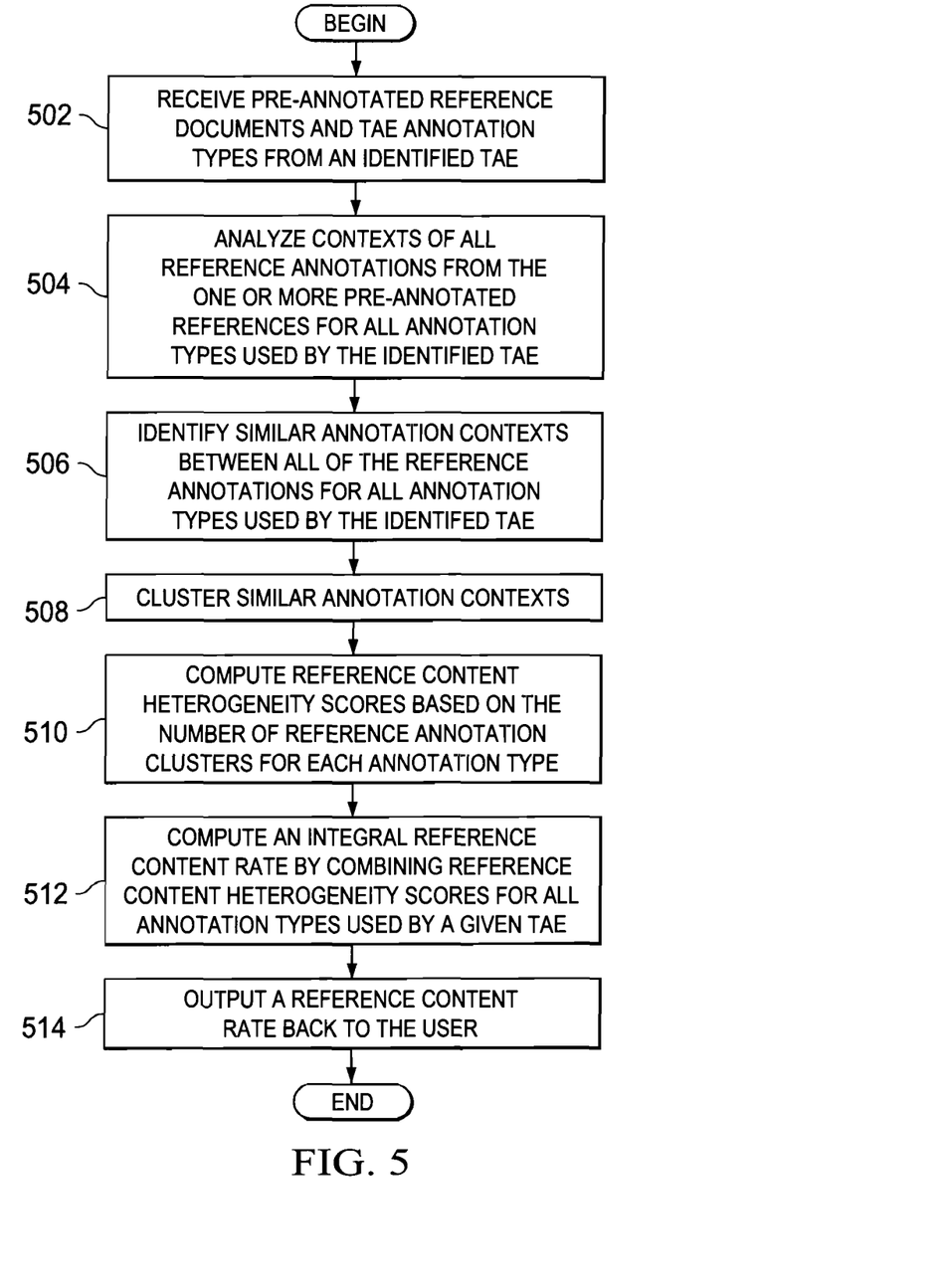
FIG. 5 depicts a flowchart illustrating an example operation performed in evaluating text analysis engines (TAEs) in accordance with an illustrative embodiment.

FIG. 5 depicts a flowchart illustrating an example operation performed in evaluating text analysis engines (TAEs) in accordance with an illustrative embodiment. As the operation begins, an annotation contexts module within a TAE evaluation engine receives pre-annotated reference documents and TAE annotation types from an identified TAE (step 502). The annotation contexts module then analyzes annotation contexts of all reference annotations from the one or more pre-annotated references for all annotation types used by the identified TAE, such as TAE 402 of FIG. 4 (step 504). The annotation contexts module identifies similar annotation contexts between all of the reference annotations for all annotation types used by the identified TAE (step 506). Once all of the similar annotation contexts have been identified, an annotation clustering module clusters similar annotation contexts (step 508).

A heterogeneity computation module then computes reference content heterogeneity scores based on the number of reference annotation clusters for each annotation type (step 510). The heterogeneity computation module may compute a normalized reference content heterogeneity score per annotation type using the following equation:

$$CH(T) = \frac{\text{number\_of\_reference\_annotation\_clusters\_for\_type\_T}}{\text{number\_of\_content\_units\_in\_reference\_content}},$$

where a content unit may be a certain amount of lines, sentences, or the like, for example, 100 sentences. The heterogeneity computation module then computes an integral reference content rate by combining reference content heterogeneity scores for all annotation types used by a given TAE (step 512). The heterogeneity computation module may combine reference content heterogeneity scores for all annotation types used by a given TAE into one integral reference content rate with equal normalizing coefficients using the following formula:

$$ContentRate = \sum_{n=1}^{N\_types} \frac{1}{N\_types} CH(T_n),$$

where N_types is the number of annotations types, and $T_n$ (n=1, N_types) are annotations types. The heterogeneity computation module then outputs the integral reference content rate to a user (step 514), with the operation ending thereafter.

Thus, the illustrative embodiments provide mechanisms for improving the credibility of text analysis engine performance evaluation by rating reference content. The mechanism improves the process of evaluating TAEs by developing reference content rates that characterize the credibility of the TAE performance metrics, which are obtained based on a given reference content. The reference content rates are based on measuring the heterogeneity of the given reference content from the point of view of the annotation types used by a given TAE.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for evaluating the performance of a text analysis engine, the method comprising:

receiving a plurality of pre-annotated reference documents;

receiving a set of annotation types associated with the pre-annotated reference documents;

analyzing annotation contexts of reference annotations in the plurality of pre-annotated reference documents using the set of annotation types;

identifying similar annotation contexts between the reference annotations and the set of annotation types;

responsive to identifying the similar annotation contexts, clustering the similar annotation contexts thereby forming a plurality of reference annotation clusters;

computing a set of reference content heterogeneity scores based on the number of reference annotation clusters for each annotation type in the set of annotation types;

computing an integral reference content rate for the set of annotation types; and outputting the integral reference content rate to a user.

2. The method of claim 1, wherein the annotation types associated with the pre-annotated reference documents are text analysis engine annotation types.

3. The method of claim 1, wherein clustering the similar annotation contexts groups reference annotations into one or more clusters is based on a similarity of the context of the similar annotation contexts.

4. The method of claim 1, wherein the set of reference content heterogeneity scores are computed using the following equation:

$$CH(T) = \frac{\text{number\_of\_reference\_annotation\_clusters\_for\_type\_T}}{\text{number\_of\_content\_units\_in\_reference\_content}},$$

wherein the number of context units in the reference content is at least one of an amount of lines or an amount of sentences.

5. The method of claim 1, wherein the integral reference content rate for the set of annotation types is computed using the following equation:

$$ContentRate = \sum_{n=1}^{N\_types} \frac{1}{N\_types} CH(T_n),$$

wherein N_types is the number of annotations types and wherein $T_n$ (n=1, N_types) are the plurality of annotations types.

6. The method of claim 1, further comprising:

computing performance rates for each annotation type in the set of annotation types.

7. The method of claim 6, wherein the performance rates for each annotation type in the set of annotation types are at least one of a precision performance rate, a recall performance rate, or a F-measure performance rate.

8. The method of claim 7, wherein the precision performance rate is computed using the following equation:

$$\text{precision} = \frac{\text{number\_of\_correct\_annotations\_created\_by\_TAE}}{\text{number\_of\_all\_annotations\_created\_by\_TAE}}$$

wherein TAE is a text analysis engine.

9. The method of claim 7, wherein the recall performance rate is computed using the following equation:

$$\text{recall} = \frac{\text{number\_of\_correct\_annotations\_created\_by\_TAE}}{\text{number\_of\_all\_annotations\_in\_the\_reference\_content}}$$

wherein TAF is a text analysis engine.

10. The method of claim 7, wherein the F-measure performance rate is computed using the following equation:

$$F - \text{measure} = 2 * \frac{(\text{precision} * \text{recall})}{(\text{precision} + \text{recall})}.$$

11. The method of claim 1, further comprising:
measuring a contribution of each annotation type to a projected usage domain;
summing weighted content heterogeneity scores for the plurality of annotation types using the following formula:

$$AdjustedContentRate(\text{domain}) = \sum_{n=1}^{N\_types} CH(T_n) \times \text{weight}(T_n, \text{domain}),$$

wherein weight ($T_n$, domain) is a weight of annotation type $T_n$ in the projected usage domain; and
outputting a credible estimation of expected performance of the text analysis engine.

12. computer program product comprising a non-transitory computer recordable storage medium having a computer readable program recorded thereon, wherein the computer readable program, when executed on a computing device, causes the computing device to:
receive a plurality of pre-annotated reference documents;
receive a set of annotation types associated with the pre-annotated reference documents;
analyze annotation contexts of reference annotations in the plurality of pre-annotated reference documents using the set of annotation types;
identify similar annotation contexts between the reference annotations and the set of annotation types;
responsive to identifying the similar annotation contexts, cluster the similar annotation contexts thereby forming a plurality of reference annotation clusters;
compute a set of reference content heterogeneity scores based on the number of reference annotation clusters for each annotation type in the set of annotation types;
compute an integral reference content rate for the set of annotation types; and
output the integral reference content rate to a user.

13. The computer program product of claim 12, wherein the computer readable program further includes computer readable program that causes the computing device to:
compute performance rates for each annotation type in the set of annotation types.

14. The computer program product of claim 12, wherein the computer readable program further includes computer readable program that causes the computing device to:
measure a contribution of each annotation type to a projected usage domain;
sum weighted content heterogeneity scores for the plurality of annotation types using the following formula:

$$AdjustedContentRate(\text{domain}) = \sum_{n=1}^{N\_types} CH(T_n) \times \text{weight}(T_n, \text{domain}),$$

wherein weight ($T_n$, domain) is a weight of annotation type $T_n$ in the projected usage domain; and
output a credible estimation of expected performance of the text analysts engine.

15. An apparatus, comprising:
a processor; and
a memory coupled to the processor, wherein the memory comprises instructions which, when executed by the processor, cause the processor to:
receive a plurality of pre-annotated reference documents;
receive a set of annotation types associated with the pre-annotated reference documents;
analyze annotation contexts of reference annotations in the plurality of pre-annotated reference documents using the set of annotation types;
identify similar annotation contexts between the reference annotations and the set of annotation types;
responsive to identifying the similar annotation contexts, cluster the similar annotation contexts thereby forming a plurality of reference annotation clusters;
compute a set of reference content heterogeneity scores based on the number of reference annotation clusters for each annotation type in the set of annotation types;
compute an integral reference content rate for the set of annotation types; and
output the integral reference content rate to a user.

16. The apparatus of claim 15, wherein the instructions further cause the processor to:
compute performance rates for each annotation type in the set of annotation types.

17. The apparatus of claim 15, wherein the instructions further cause the processor to:
measure a contribution of each annotation type to a projected usage domain;
sum weighted content heterogeneity scores for the plurality of annotation types using the following formula:

$$AdjustedContentRate(\text{domain}) = \sum_{n=1}^{N\_types} CH(T_n) \times \text{weight}(T_n, \text{domain}),$$

wherein weight ($T_n$, domain) is a weight of annotation type $T_n$, in the projected usage domain; and
output a credible estimation of expected performance of the text analysis engine.

* * * * *